United States Patent
Götz et al.

(10) Patent No.: US 10,637,314 B2
(45) Date of Patent: Apr. 28, 2020

(54) BAR WINDING ARRANGEMENT OF A STATOR OR A ROTOR OF AN ELECTRIC MACHINE

(71) Applicant: Dr. Ing. h.c. F. Porsche Aktiengesellschaft, Stuttgart (DE)

(72) Inventors: Stefan Götz, Forstern (DE); Malte Jaensch, Bietigheim-Bissingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 99 days.

(21) Appl. No.: 15/814,693

(22) Filed: Nov. 16, 2017

(65) Prior Publication Data

US 2018/0152068 A1  May 31, 2018

(30) Foreign Application Priority Data

Nov. 30, 2016 (DE) .......................... 10 2016 123 067

(51) Int. Cl.
*H02K 3/12* (2006.01)
*H02K 3/48* (2006.01)
(Continued)

(52) U.S. Cl.
CPC .................. *H02K 3/12* (2013.01); *H02K 3/28* (2013.01); *H02K 3/48* (2013.01); *H02K 15/024* (2013.01)

(58) Field of Classification Search
CPC .......... H02K 15/024; H02K 3/12; H02K 3/28; H02K 3/48
(Continued)

(56) References Cited

U.S. PATENT DOCUMENTS 6,956,313 B2  10/2005  El-Gabry et al.
7,009,320 B2  3/2006  Akita et al.
(Continued)

FOREIGN PATENT DOCUMENTS

DE           7801259 U1    6/1979
DE      102009040684 A1    3/2010
(Continued)

OTHER PUBLICATIONS

Notification of Reason for Rejection for Japanese Application No. 2017-228628, dated Oct. 3, 2018, 2 pages.
(Continued)

*Primary Examiner* — Alex W Mok
(74) *Attorney, Agent, or Firm* — RatnerPrestia (57) ABSTRACT

The invention relates to a bar winding arrangement of a stator or a rotor of an electric machine, including a number of bar segments, which are housed in a plurality of slots of the stator or the rotor and are electrically connected to one another in such a way that they form a continuous winding of the stator or the rotor, wherein each of the slots is divided by the bar segments into a first group of bar segments and at least one second group of bar segments, wherein the bar segments of the first group have a smaller cross section than the bar segments of the second group, wherein the bar segments of the first group are electrically connected in series and the bar segments of the second group are electrically connected in series and in parallel with the bar segments of the first group and wherein the bar segments of the first group are arranged closer to a slot opening in the radial direction than the bar segments of the second group.

13 Claims, 6 Drawing Sheets

(51) Int. Cl.
*H02K 3/28* (2006.01)
*H02K 15/02* (2006.01)

(58) Field of Classification Search
USPC .......................................................... 310/201
See application file for complete search history.

(56) References Cited

U.S. PATENT DOCUMENTS

| | | | |
|---|---|---|---|
| 7,759,835 B2 | 7/2010 | Inderka et al. | |
| 8,330,318 B2 | 12/2012 | Saito et al. | |
| 8,729,765 B2 | 5/2014 | Hao | |
| 8,779,643 B2 | 7/2014 | Umeda et al. | |
| 2004/0061402 A1* | 4/2004 | Kouda | H02K 3/28 |
| | | | 310/208 |
| 2005/0162025 A1 | 7/2005 | Sivasubramaniam et al. | |
| 2005/0212372 A1 | 9/2005 | Akita et al. | |
| 2008/0238240 A1* | 10/2008 | Takahashi | H02K 3/28 |
| | | | 310/201 |
| 2009/0140596 A1 | 6/2009 | Kaiser et al. | |
| 2009/0261683 A1* | 10/2009 | Sadiku | H02K 3/12 |
| | | | 310/207 |
| 2010/0026132 A1 | 2/2010 | Ooiwa et al. | |
| 2011/0043069 A1* | 2/2011 | Tanaka | H02K 3/28 |
| | | | 310/198 |
| 2013/0026875 A1* | 1/2013 | Hao | H02K 3/12 |
| | | | 310/198 |
| 2013/0076188 A1* | 3/2013 | Ikeda | H02K 3/28 |
| | | | 310/195 |
| 2013/0113330 A1* | 5/2013 | Saito | H02K 3/28 |
| | | | 310/207 |
| 2014/0125187 A1* | 5/2014 | Suzuki | H02K 3/12 |
| | | | 310/202 |
| 2014/0361646 A1* | 12/2014 | Saito | H02K 3/28 |
| | | | 310/51 |
| 2015/0102699 A1* | 4/2015 | Mathoy | H02K 1/165 |
| | | | 310/213 |
| 2015/0207374 A1* | 7/2015 | Tsuiki | H02K 3/28 |
| | | | 310/202 |
| 2015/0244227 A1* | 8/2015 | Wakimoto | H02K 3/28 |
| | | | 310/208 |

FOREIGN PATENT DOCUMENTS

| | | |
|---|---|---|
| DE | 102010036428 A1 | 2/2011 |
| DE | 102012212870 A1 | 1/2013 |
| FR | 2816122 A1 | 5/2002 |
| JP | 2005110361 A | 4/2005 |
| JP | 2005287109 A | 10/2005 |
| JP | 2012186938 A | 9/2012 |

OTHER PUBLICATIONS

German Search Report for German Application No. 10 2016 123 067.7, with partial English translation, dated Sep. 6, 2017—8 Pages.
Indian Examination Report for Indian Application No. 201714037769. dated Feb. 21, 2020 with translation, 6 pages.

\* cited by examiner

BAR WINDING ARRANGEMENT OF A STATOR OR A ROTOR OF AN ELECTRIC MACHINE

CROSS-REFERENCE TO RELATED APPLICATIONS

This application claims priority to German Patent Application No. DE 10 2016 123 067.7, filed Nov. 30, 2016, which is incorporated by reference herein in its entirety.

FIELD OF THE INVENTION

The present invention relates to a bar winding arrangement of a stator or a rotor of an electric machine, comprising a number of bar segments, which are housed in a plurality of slots of the stator or the rotor and are electrically connected to one another in such a way that they form a continuous winding of the stator or the rotor.

BACKGROUND OF THE INVENTION

Electric machines that have a stator and a rotor are known in different embodiments from the prior art. The windings in the stators and/or rotors of said electric machines are often formed by relatively thin individual wires, in particular of copper, which are inserted into the openings of a stator or rotor iron, the so-called slots, manually or with the aid of corresponding winding or pull-in machines. Typical diameters of the wires used here are approximately 2 mm.

Alternatively, it is also possible to use what are known as bar windings of copper, whereby individual bar segments are inserted into the slots instead of the individual wires. Said bar segments are shaped in such a way that they can be connected to one another at the ends thereof, in particular by welding, to form a bar winding arrangement, which forms a continuous winding of the stator and/or rotor. In the prior art, U- or V-shaped individual bar segments are often used in particular, said bar segments being reminiscent of hairpins due to their shaping and therefore often also being referred to as hairpins. Bar winding arrangements of this kind afford some advantages in comparison to the conventional individual wire windings. Whereas the manufacture of individual wire windings still requires many manual manufacturing steps in spite of a high degree of automation, bar winding arrangements can be produced in a fully automatic manner. Moreover, bar winding arrangements permit a better use of space of the slots, since bar segments having a rectangular cross section, which have a relatively large cross-sectional area, are generally used. When thinner individual wires are used, empty spaces always remain within the slots, even in the case of a tight geometric packing. Further packing losses arise as a result of an electrical insulation coating provided for the individual wires. Whereas slot filling factors with an order of magnitude of from approximately 30% to 50% arise in the case of windings of individual wires, slot filling factors of more than 80% can be achieved with the aid of bar winding arrangements. As a result, higher machine powers can be achieved with a smaller installation space.

More reliable electrical insulation between the bar segments themselves and between the bar segments and the stator or rotor iron is possible owing to the well-defined surfaces and the relatively large dimensions of the individual bar segments, in particular when using the hairpin-shaped bar segments ("hairpins").

As is known from U.S. Pat. No. 8,330,318, which is incorporated by reference herein, when using substantially U-shaped bar segments, during assembly the individual segments can be inserted into the slots starting from the front side, with the result that it is possible to realize slots that are closed toward the rotor and are half-open to form an air gap, which can be achieved only with great difficulty or not at all in the case of conventional individual wire windings having a continuous wire.

Electric machines, in which bar winding arrangements based on hairpin-shaped bar segments are used, are of great interest, particularly in the automotive industry, due to the high energy density thereof and the possibility of automated manufacture. Examples of bar winding arrangements of this type are provided by DE 10 2010 036 428 A1, which is incorporated by reference herein, or US 2009/0140596 A1, which is incorporated by reference herein. As is known from U.S. Pat. No. 7,759,835 B2, which is incorporated by reference herein, or DE 10 2009 040 64 A1, which is incorporated by reference herein, instead of the U-shaped or V-shaped hairpin-like bar segments, which during assembly can be inserted into two slots, it is also possible to use shorter bar segments, which are each inserted into just one slot.

Bar winding arrangements having solid bar segments, which generally have a rectangular cross section, have considerable advantages compared to conventional individual wire windings in central key ratios, in particular at medium rotation speeds of the electric machine. However, in the case of high rotation speeds of the electric machine, in particular at rotation speeds of approximately 11000 rotations per minute and higher, the large cross sections of the bar segments give rise to relatively high power losses, which are caused by high-frequency effects.

In actual fact, a lower winding resistance and therefore lower losses should be able to be achieved by the higher slot filling factor that can be achieved by means of the bar winding arrangements. However, this is true only for direct current operation. However, at relatively high frequencies, as occur in a rotating electric machine, the losses actually increase. Although bar winding arrangements are clearly superior to individual wire windings in respect of their efficiency at low rotation speeds, the losses usually increase very greatly at high rotation speeds. The reason for this is high-frequency effects on account of the frequency, which increases with the rotation speed, both of the rotating field passing through the bar segments in the slot and the usually sinusoidal control current, which itself generates a magnetic field around itself. From a physical point of view, there are two mechanisms that create losses that increase, approximately quadratically, with the rotation speed. The skin effect and the proximity effect increase the effective resistance of the bar segments in such a way that relatively high losses are generated indirectly, since the electric current has to bridge a relatively high resistance. Furthermore, eddy currents in adjacent bar segments directly cause increased losses. Since the magnetic fields are largest in the vicinity of the slot openings, the two aforementioned effects are likewise greatest there. In order to counter said high-frequency effects, it is known from the prior art to segment the bar winding arrangements to a greater degree, by using a plurality of bar segments having smaller cross sections, for example, instead of bar segments having a large cross section. This is known, for example, from U.S. Pat. No. 6,956,313 B2. However, it has been shown that segmentation alone is not enough to reduce the power losses to a satisfactory degree.

SUMMARY OF THE INVENTION

An object of the present invention is to provide a bar winding arrangement of the type mentioned at the outset, in which power losses at high rotation speeds of the electric machine can be further reduced in a simple manner.

Said object is achieved by way of a bar winding arrangement of the type mentioned at the outset having the features of claim 1. The subclaims relate to advantageous developments of the invention.

A bar winding arrangement according to aspects of the invention is wherein each of the slots is divided by the bar segments into a first group of bar segments and at least one second group of bar segments, wherein the bar segments of the first group have a smaller cross section than the bar segments of the second group, wherein the bar segments of the first group are electrically connected in series and the bar segments of the second group are electrically connected in series and in parallel with the bar segments of the first group and wherein the bar segments of the first group are arranged closer to a slot opening in the radial direction than the bar segments of the second group. The invention is based on the insight that the high-frequency effects explained further above are concentrated, in particular, in the vicinity of the slot openings of the slots of the stator and/or rotor and have a significant influence on the power losses in this region. In the present invention, therefore, it is proposed to segment the slots in an uneven manner by means of the bar segments, wherein the first group of bar segments, which have a smaller cross section than the bar segments of the second group, is arranged further towards the outside in each of the slots and therefore in the vicinity of the slot opening. The bar segments of the two groups are in this case advantageously divided up in a manner that is as parallel as possible to the magnetic field lines or along the magnetic field lines. Through the use of smaller cross sections, there is a higher degree of segmentation in the vicinity of the slot openings, in which very high alternating magnetic fields arise, than in the regions of the slots that lie further inward in the radial direction. As a result thereof, a high slot filling factor can advantageously be achieved, wherein, due to the particular type of interconnection, comparatively low high-frequency effects arise simultaneously at those locations within the slots in which effects of this kind dominate the losses.

In a preferred embodiment, it is proposed that all the first groups of the bar segments that are connected in series and all the second groups of the bar segments that are connected in series are connected in parallel with one another. A parallel connection at the opposite ends of the bar segment arrangement, and not after each individual slot, which forms, together with the bar segments housed therein, a partial segment of the bar segment arrangement, is advantageously provided here, since the relatively small loops that arise here would lead to high local eddy currents. In other words, therefore, all first groups are advantageously connected in series and all second groups are advantageously connected in series and in parallel with the first group. Advantageously, across the entire bar winding arrangement, a large portion of the different field flux of the parallel-connected bar segments of the two groups is mutually canceled out.

In an embodiment, it is proposed that the cross sections of the bar segments of all the first groups and of the bar segments of all the second groups are selected in such a way that
  both groups have similar resistances in a main load region of the electric machine or
  both groups in cross section have a similar total current density or
  both groups in cross section have a similar power loss density or
  the total electrical losses of both groups are minimized. In this way, it is possible for the cross sections of the bar segments of the first group and the bar segments of the second group to advantageously be optimized either for a specific target load region or over a drive cycle.

In an advantageous embodiment, the first groups of bar segments and the second groups of bar segments can have end windings that run in the same direction. In this connection, it is expedient for the first groups of bar segments and the second groups of bar segments to be connected to one another at opposite ends of the bar winding arrangement in each case by at least one connection segment that extends over one or more layers of the bar segments. Alternatively, the bar segments can also be bent over a plurality of layers and be welded to one another at the opposite ends.

In an alternative embodiment, there is also the possibility for the first groups of bar segments and the second groups of bar segments to have end windings that run in opposite directions. In other words, in this embodiment, one of the two groups of bar segments is wound in an inverted manner with respect to the other group in such a way that the two groups extend in an inverted manner through the slots of the stator and/or the rotor and meet at one of the two opposite ends of the bar segment arrangement. In this connection, it is expedient for the first groups of bar segments and the second groups of bar segments to be welded to one another at a first end of the bar winding arrangement and to be connected to one another at a second end, which is opposite the first end, by at least one connection segment that extends over one or more layers of the bar segments.

In the case of a serial winding of the bar winding arrangement, said serial winding being advantageous per se, the resistance within the individual bar segment groups should permit similar currents so that a bottleneck is not created. This is therefore very demanding, in particular, precisely because the bar segments of the first group have a small cross section in the vicinity of the slot opening and said small cross section can not be increased, as described above, on account of the eddy current losses that are increased as a result by local, that is to say directly parallel-connected, groups of bar segments. In order to relieve this problem, an advantageous refinement proposes that at least one third group having one or more bar segments is formed in each of the slots, said one or more bar segments having a greater cross section than the bar segments of the first group and the bar segments of the second group and being arranged closer to a slot base of the respective slot than the second group of bar segments. The bar segments of the third groups of all of the slots can preferably be connected in series between the opposite ends of the bar winding arrangement. It has been shown that the two parallel-connected first and second groups of bar segments can be configured in such a way that they can prevent the aforementioned bottleneck, as soon as they are connected in series with the third group.

The object on which the present invention is based is also solved by a bar winding arrangement of the type mentioned at the outset, which is distinguished by the fact that the bar segments are configured and arranged in the slots and connected to one another in such a way that the bar segments create fully parallel sub-segmentation within the slots. Sub-segmentation is performed in each slot. This measure leads to a subdivision of the bar segment arrangement into strips, which can, however, be joined together in fixed fashion. An individual bar segment of said bar segment arrangement can in this case pass through either just one slot, two slots (the bar segment is typically embodied as a "hairpin" here) or a plurality of slots, before it makes contact with one or more next bar segments.

In a particularly advantageous embodiment, there can be provision for the bar segments to have a rectangular cross section. Very high slot filling factors can be achieved as a result.

In the embodiments described here, the winding of the stator and/or rotor that is formed by the bar winding arrangement can be either a wave winding or, alternatively, a loop winding. The wave winding can be formed, for example, by connecting appropriately shaped hairpin-like bar segments, which can engage in two slots, or hairpin portion-like bar segments, that can engage in one slot. When there is provision for a loop winding, the bar segments are shaped in a loop-like fashion and penetrate a plurality of slots of the stator and/or rotor.

BRIEF DESCRIPTION OF THE DRAWINGS

Further features and advantages of the present invention will become clear from the following description of preferred exemplary embodiments with reference to the accompanying figures, in which.

DETAILED DESCRIPTION OF THE INVENTION

Figure 1:
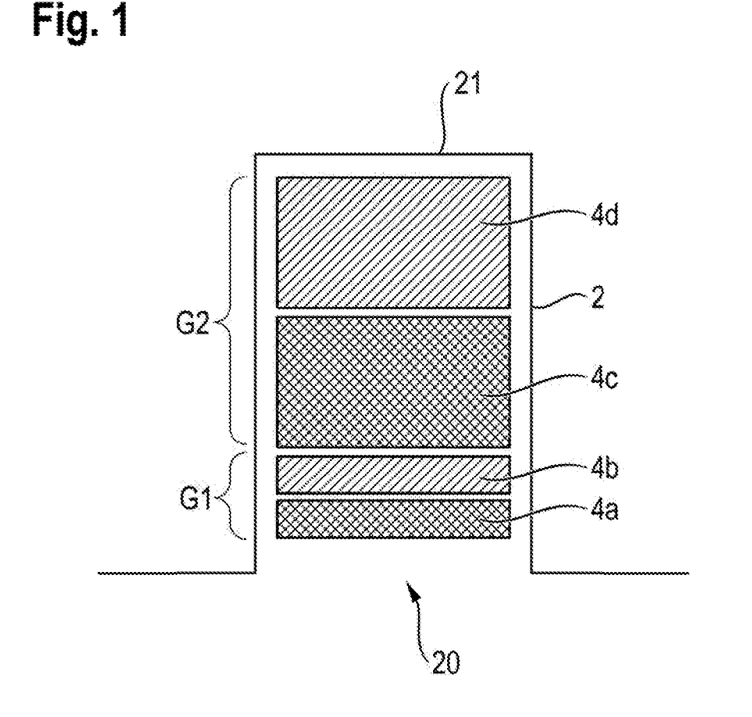
FIG. 1 shows a schematically highly simplified illustration of one of the slots of a stator of an electric machine, in which bar segments of a bar winding arrangement are arranged, which is embodied in accordance with a first exemplary embodiment of the present invention.

With reference to FIGS. 1 to 6, a bar winding arrangement 1 of a stator 3 or a rotor of an electric machine has a plurality of slots 2, of which one is shown in detail in FIG. 1. In this exemplary embodiment, four bar segments 4a, 4b, 4c, 4d are housed within said slots 2 in each case. It is clear from the illustration in accordance with FIG. 1 that said four bar segments 4a, 4b, 4c, 4d have different cross sections. In each of the slots 2, a first bar segment 4a and a second bar segment 4b have a smaller cross section than a third bar segment 4c and a fourth bar segment 4d. The first bar segment 4a and the second bar segment 4b form a first group G1 of bar segments 4a, 4b, which, in this exemplary embodiment, have substantially identical, preferably rectangular, cross sections, but could also have different cross sections, which are smaller than the cross sections of the third bar segment 4c and the fourth bar segment 4d. The third bar segment 4c and the fourth bar segment 4d form a second group G2 of bar segments 4c, 4d, which, in this exemplary embodiment, have substantially identical, preferably rectangular, cross sections, but could also have different cross sections, which are larger than the cross sections of the first bar segment 4a and the second bar segment 4b.

The first group G1 of bar segments 4a, 4b is arranged within the slots 2 further towards the outside in the radial direction in the vicinity of a slot opening 20 than the second group G2 of bar segments 4c, 4d. The third and fourth bar segment 4c, 4d of the second group G2 are therefore arranged closer to a slot base 21 of the slot 2 than the first and second bar segment 4a, 4b. Since the magnetic flux density is generally highest in the region of the slot opening 20 of the slots 2, it is advantageous to provide finer segmentation there so that the cross sections of the first and second bar segments 4a, 4b are very deliberately selected to be smaller than the cross sections of the third and fourth bar segments 4c, 4d that lie further inward in the radial direction. Since relatively large alternating fields arise in the region of the slot opening 20, said finer subdivision into the first and second bar segments 4a, 4b having the smaller cross sections is to particularly advantageous in this region because undesired flows of current on account of magnetic fields can advantageously be prevented.

Figure 2:
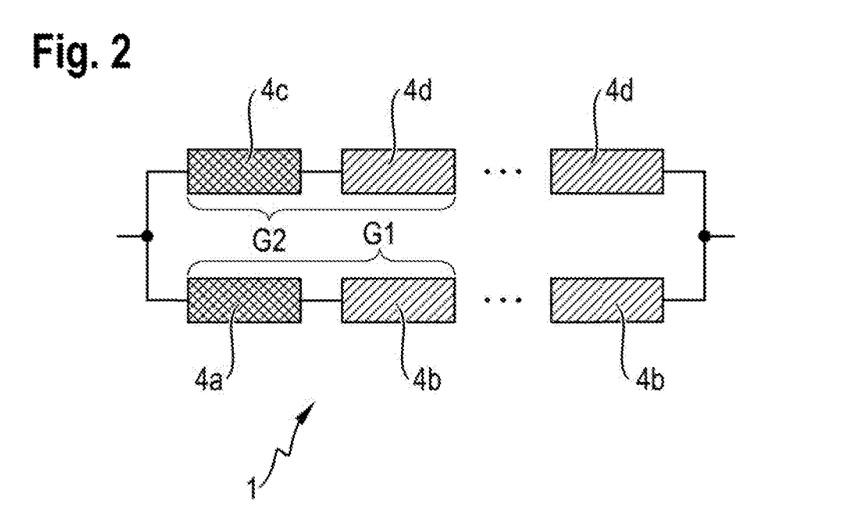
FIG. 2 shows a schematically highly simplified illustration, which illustrates an electrical interconnection of the bar segments of the bar winding arrangement in accordance with the first exemplary embodiment of the present invention.
Figure 3:
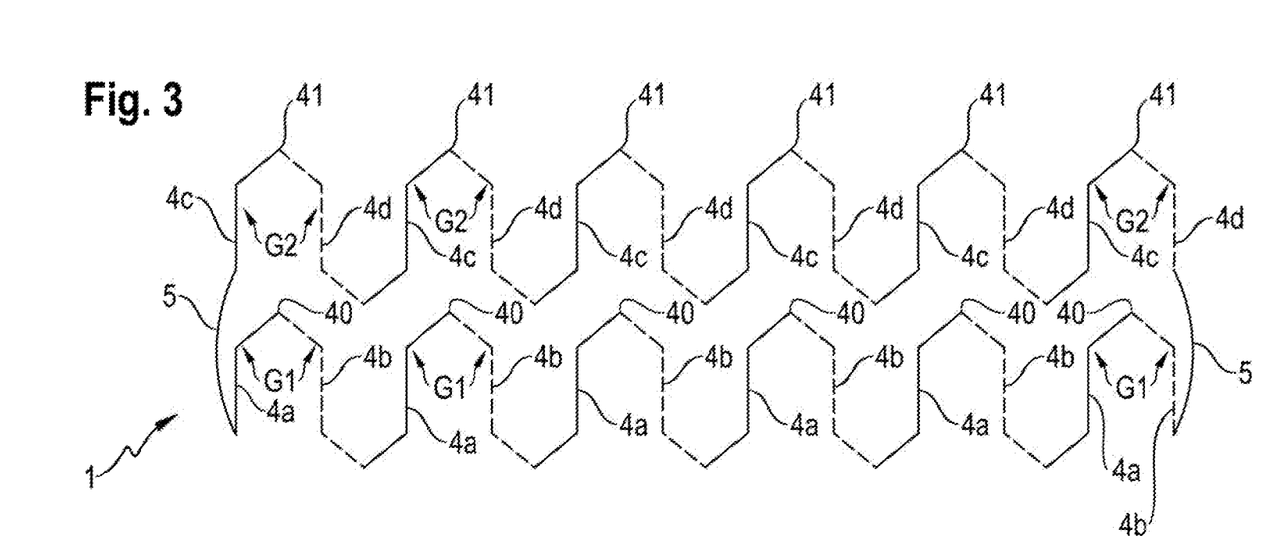
FIG. 3 shows a first winding diagram of the bar winding arrangement in accordance with the first exemplary embodiment of the present invention in a schematically highly simplified illustration.
Figures 5, 6:
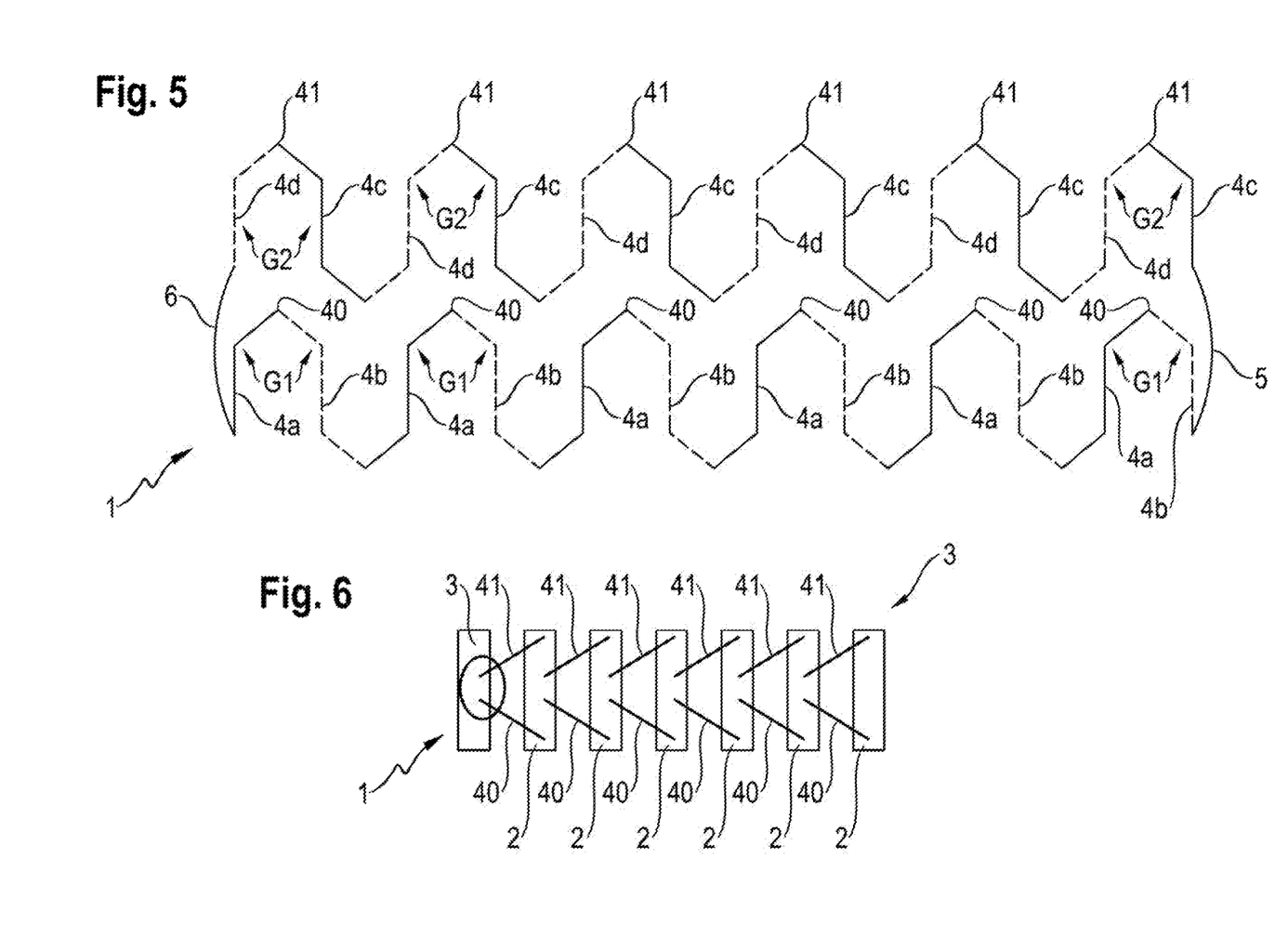
FIG. 5 shows a second winding diagram of the bar winding arrangement in accordance with the first exemplary embodiment of the present invention in a schematically highly simplified illustration.
FIG. 6 shows a top view of an end winding of the bar winding arrangement when using the winding diagram in accordance with FIG. 5.

As can be seen in the schematic illustration in accordance with FIG. 2 and in the two winding diagrams in accordance with FIGS. 3 and 5, all first and second bar segments 4a, 4b of the first group G1 within the slots 2 are in each case connected to one another in series. Furthermore, the first groups G1 of the first and second bar segments 4a, 4b of all slots 2 of the stator 3 are connected to one another in series. All third and fourth bar segments 4c, 4d of the second group G2 are likewise in each case connected to one another in series within the slots 2. Furthermore, the second groups G2 of the first and second bar segments 4a, 4b of all slots 2 of the stator 3 are connected to one another in series. The overall result across all slots 2 of the stator 3 is a parallel connection of the first groups G1 of the first and second bar segments 4a, 4b of all slots 2 to the second groups G2 of the third and fourth bar segments 4c, 4d of all slots 2, said parallel connection being very simple to realize.

In this connection, it is advantageous to provide the parallel connection at the opposite ends of the bar winding arrangement 1 of the stator 3, not, however, after each of the slots 2 that form a partial segment of the bar winding arrangement 1, since the loops that otherwise result therefrom would cause high local eddy currents. In contrast, a large portion of the different field flux of the bar segments 4a, 4b, 4c, 4d of the two groups G1, G2 that are connected in parallel to one another across all slots 2 of the stator 3 is advantageously canceled out.

Since both bar segment groups G1, G2 extend across all slots 2 of the stator 3, both bar segment groups G1, G2 could generate at least approximately the magnetic field without the aid of the respectively other bar segment group G1, G2. On account of the parallel connection, the current is divided between the two bar segment groups in an inverse manner to the ratio of the electrical resistances of the two bar segment groups G1, G2.

The cross sections of the bar segments 4a, 4b of all the first groups G1 and the bar segments 4c, 4d of all of the second groups G2 are preferably selected in such a way that
- both groups G1, G2 have similar resistances in a main load region of the electric machine or
- both groups G1, G2 in cross section have a similar total current density or
- both groups G1, G2 in cross section have a similar power loss density or
- the total electrical losses of both groups G1, G2 are minimized. In this way, it is possible for the cross sections of the bar segments 4a, 4b of the first group G1 and the bar segments 4c, 4d of the second group G2 to advantageously be optimized either for a specific target load region or over a drive cycle.

Figure 4:
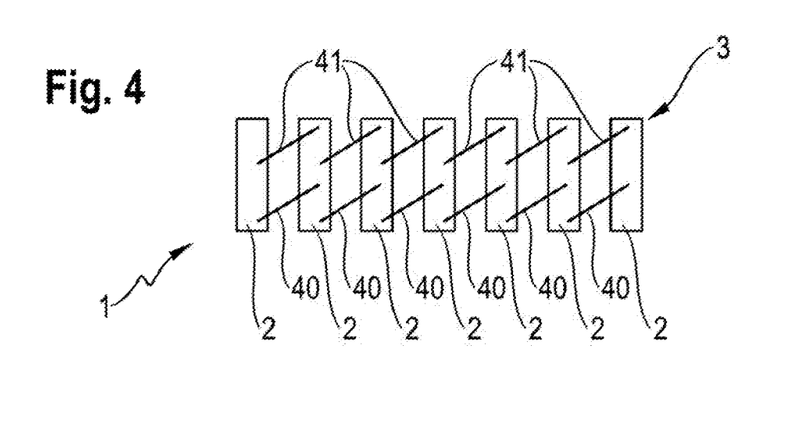
FIG. 4 shows a top view of an end winding of the bar winding arrangement when using the winding diagram in accordance with FIG. 3.

A first winding diagram of the bar winding arrangement 1, which is embodied in accordance with the first exemplary embodiment of the present invention, is illustrated in FIG. 3 in a schematically highly simplified manner. In the present case, this is a same-direction winding diagram. Here, in each of the slots 2, the first bar segment 4a is connected in series with the second bar segment 4b of the first group G1 in each case. The second bar segment 4b in the relevant slot 2 is connected in series with the first bar segment 4a of the first group G1 of a further slot 2, in particular an adjacent slot 2, and so on. In each of the slots 2, in each case the third bar segment 4c is connected in series with the fourth bar segment 4d of the second group G2. The fourth bar segment 4d of the relevant slot 2 is connected in series with the third bar segment 4c of a further slot 2, in particular an adjacent slot 2, and so on. This results in the parallel connection of the first and second bar segments 4a, 4b with the third and fourth bar segments 4c, 4d of the two groups G1, G2 across all slots 2. A connection segment 5, which connects the two parallel layers to one another, is provided in each case at both opposite ends of the bar segment arrangement 1. Alternatively, the bar segments 4a, 4c, 4b, 4d provided on the end side can also be bent over a plurality of layers and be welded to one another. FIG. 4 shows a top view of an end winding 40, 41 of the bar winding arrangement 1 using the winding diagram in accordance with FIG. 3. It is clear from this illustration that the transitions between the slots 2 run parallel to one another.

A second winding diagram of the bar winding arrangement 1, which is embodied in accordance with the first exemplary embodiment of the present invention, will be explained below in more detail with reference to FIGS. 5 and 6. In the present case, this is an opposite-direction winding diagram. The winding of the first group G1 corresponds here to that of the first winding diagram in accordance with FIGS. 3 and 4. In each of the slots 2, in each case the fourth bar segment 4d is connected in series with the third bar segment 4c of the second group G2. The third bar segment 4c of the relevant slot 2 is now connected in series with the fourth bar segment 4d of a further slot 2, in particular an adjacent slot 2, and so on. One of the two layers of the bar winding arrangement 1 is an therefore wound in the inverted direction. As can be seen in the top view in accordance with FIG. 6, in this winding diagram, the transitions between the slots 2 diverge in a substantially V-shaped manner. The layers meet at one of the two opposite sides of the bar winding arrangement 1 and can be connected to one another there, for example by a welded connection 6. On the opposite side, however, a connection segment 5 is preferably used to connect the layers.

Figure 7:
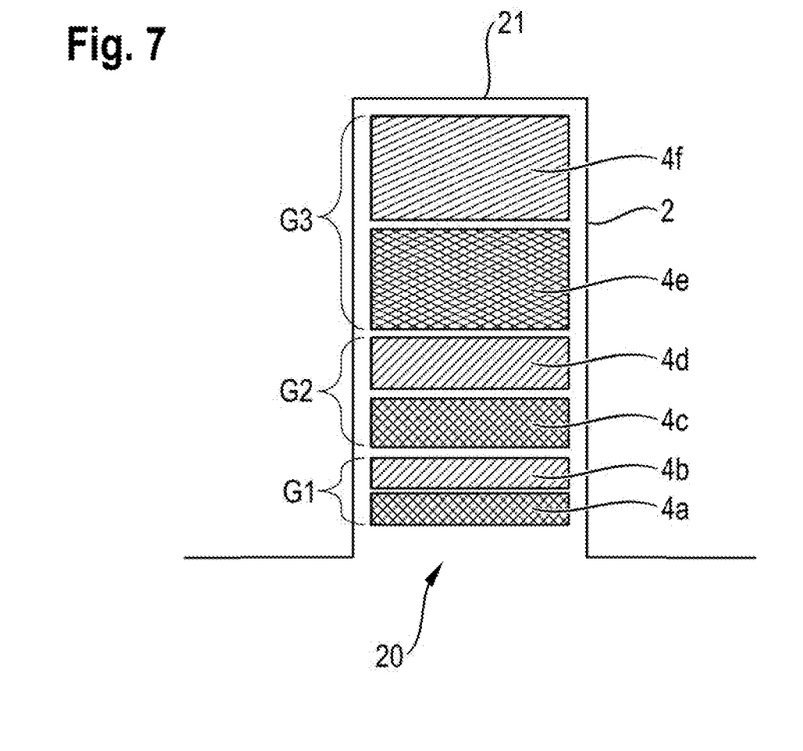
FIG. 7 shows a schematically highly simplified illustration of one of the slots of the stator of the electric machine, in which bar segments of a bar winding arrangement are arranged, which is embodied in accordance with a second exemplary embodiment of the present invention.
Figure 8:
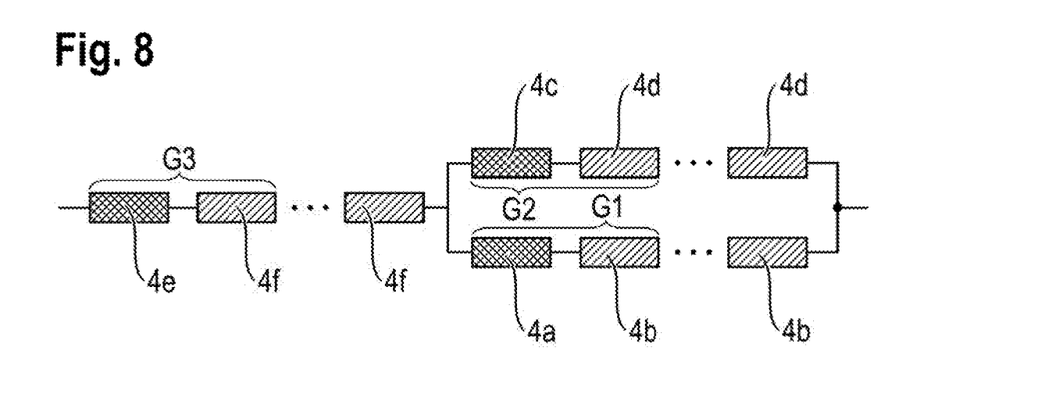
FIG. 8 shows a schematically highly simplified illustration, which illustrates an electrical interconnection of the bar segments of the bar winding arrangement in accordance with the second exemplary embodiment of the present invention.

In the case of a serial winding of the bar winding arrangement 1, said serial winding being advantageous per se, the resistance within the individual bar segment groups G1, G2 should permit similar currents so that a bottleneck is not created. This is therefore very demanding, in particular, precisely because the bar segments 4a, 4b of the first coil group G1 in the vicinity of the slot opening 20 have a small cross section and said small cross section can not be increased, as described above, on account of the eddy current losses that are increased as a result by local, that is to say directly parallel-connected, groups GL, G2 of bar segments 4a, 4b, 4c, 4d. A second exemplary embodiment of a bar winding arrangement 1 of a stator 3 or rotor of an electric machine that deals with this problem will be explained in more detail below with reference to FIG. 7 to 9. In addition to the first group G1 having the first and the second bar segment 4a, 4b and the second group G2 having the third and the fourth bar segment 4c, 4d, a third group G3 having a fifth and a sixth bar segment 4e, 4f is arranged in each of the slots 2. The bar segments 4e, 4f of the third group G3 have a larger cross section than the bar segments 4a, 4b of the first group G1 and the bar segments 4c, 4d of the second group G2 and are arranged closer to the slot base 21 of the respective slot 2 than the second group G2 of bar segments 4c, 4d. As can be seen in FIG. 8, the first and second groups G1, G2 form, in turn, a parallel connection, which is embodied in the manner described above. In the present case, the winding of the first and second groups G1, G2 across all slots 2 is embodied as a winding that runs in the same direction, as is shown in FIG. 3. In principle, said winding could also be embodied to run in the opposite direction, as in FIG. 5.

Figure 9:
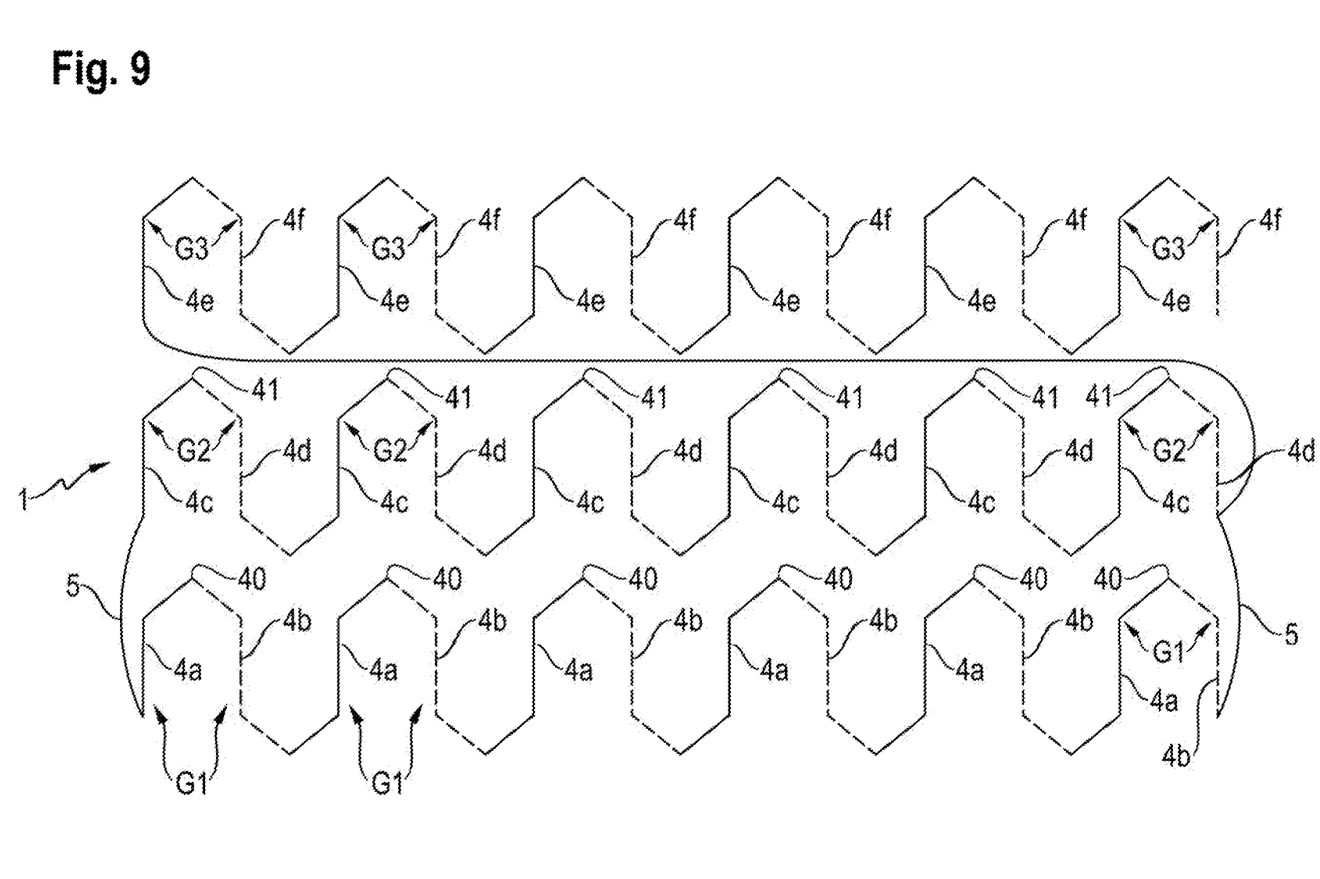
FIG. 9 shows a winding diagram of the bar winding arrangement in accordance with the second exemplary embodiment of the present invention in a schematically highly simplified illustration.

As can also be seen from the winding diagram in accordance with FIG. 9, within each of the slots 2, the fifth bar segment 4e of the third group G3 is connected in series with the sixth bar segment 4f. The sixth bar segment 4f is electrically connected in series with a fifth bar segment 4e of a further slot, in particular an adjacent slot 2, and so on. The thus formed series connection of the fifth and sixth bar segments 4e, 4f of the groups G3 across all slots 2 is connected in series with the two parallel-connected groups G1 and G2. It has been shown that the two parallel-connected first and second groups of bar segments 4a, 4b, 4c, 4d can be configured in such a way that they can prevent the aforementioned bottleneck, as soon as they are connected in series with the third group G3.

In the exemplary embodiments described above, the bar segments 4a, 4b, 4c, 4d, 4e, 4f are shaped in the manner of a hairpin segment and can be welded to one another at the ends thereof after they have been inserted into the slots 2.

Figure 10:
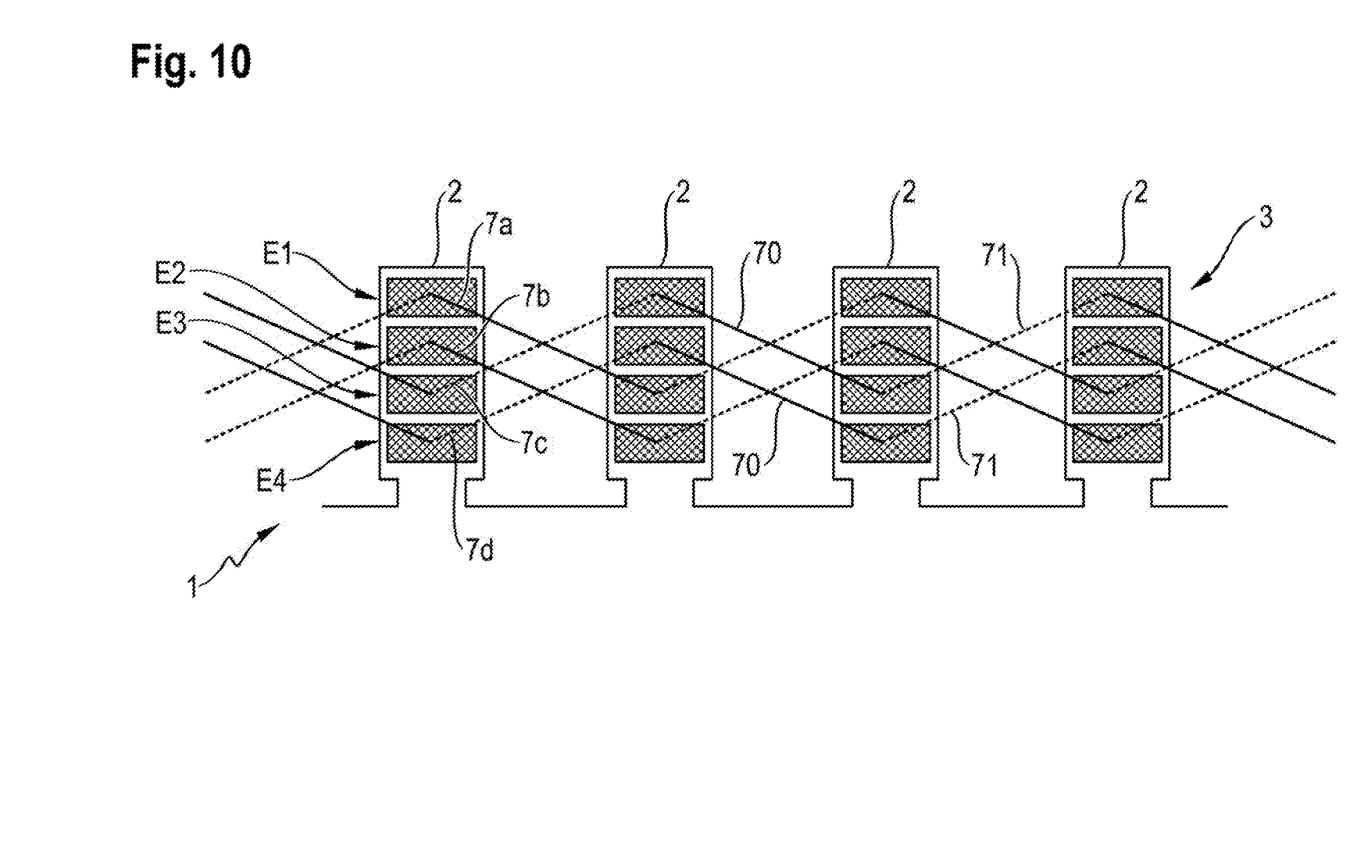
FIG. 10 shows a schematically highly simplified illustration of a plurality of slots of a stator of an electric machine, in which bar segments of a bar winding arrangement are arranged, which is embodied in accordance with a third exemplary embodiment of the present invention.

FIG. 10 shows a schematically highly simplified view of a plurality of slots 2 of a stator 3 of an electric machine, in which bar segments 7a, 7b, 7c, 7d of a bar winding arrangement 1 are arranged in accordance with a third exemplary embodiment of the present invention. In this case, each of the slots 2 is divided into four bar segment levels E1, E2, E3, E4, which have been illustrated by way of example for the slot 2 that is illustrated on the left-hand side of FIG. 10. The winding diagram for each of the slots 2 provides that a first bar segment 7a engages in the first bar segment level E1 of a first slot 2 and in the third bar segment level E3 of a second slot 2, a second bar segment 7b engages in the second bar segment level E2 of the first slot 2 and in the fourth bar segment level E4 of the second slot 2, a third bar segment 7c engages in the third bar segment level E3 of the first slot 2 and in the first bar segment level E1 of the second slot 2, and a fourth bar segment 7d engages in the fourth bar segment level E4 of the first slot 2 and in the second bar segment level E2 of the second slot 2.

This measure achieves fully parallel segmentation of all slots 2 by means of the bar winding arrangement 1. A front end winding 70 has been illustrated in FIG. 10 using solid lines, whereas a rear end winding 71 has been symbolized by means of dashed lines.

The exemplary embodiments of the invention have been explained by way of example with reference to a stator 3 of an electric machine. It should be emphasized at this point that the designs described here are also suitable for a rotor of an electric machine.

What is claimed is:

1. A bar winding arrangement of a stator or a rotor of an electric machine, the stator or the rotor having a plurality of slots, comprising:
   bar segments housed in the plurality of slots of the stator or the rotor, the bar segments electrically connected to one another such that they form a continuous winding of the stator or the rotor, wherein each of the slots includes a first group of bar segments and a second group of bar segments, the bar segments of the first group have a smaller cross section than the bar segments of the second group, the bar segments of the first group are electrically connected in series, the bar segments of the second group are electrically connected in series, the first and second groups are electrically connected in parallel, and the bar segments of the first group are arranged closer to a slot opening in a radial direction than the bar segments of the second group.

2. The bar winding arrangement as claimed in claim 1, wherein all the bar segments of the first group that are connected in series and all the bar segments of the second group that are connected in series are connected in parallel with one another.

3. The bar winding arrangement as claimed in claim 1, wherein the cross sections of the bar segments of the first group and of the bar segments of the second group are selected such that both groups of bar segments have similar resistances in a main load region of the electric machine.

4. The bar winding arrangement as claimed in claim 1, wherein the cross sections of the bar segments of the first group and of the bar segments of the second group are selected such that both groups of bar segments in cross section have a similar total current density.

5. The bar winding arrangement as claimed in claim 1, wherein the cross sections of the bar segments of the first group and of the bar segments of the second group are selected such that both groups of bar segments in cross section have a similar power loss density.

6. The bar winding arrangement as claimed in claim 1, wherein the cross sections of the bar segments of the first group and of the bar segments of the second group are selected such that the total electrical losses of both groups of bar segments are minimized.

7. The bar winding arrangement as claimed in claim 1, wherein the first group of bar segments and the second group of bar segments each have end windings that run in the same direction.

8. The bar winding arrangement as claimed in claim 7, wherein each of the first group of bar segments and the second group of bar segments are connected to one another at opposite ends of the bar winding arrangement by at least one connection segment that extends over one or more layers of the bar segments.

9. The bar winding arrangement as claimed in claim 1, wherein each of the first group of bar segments and the second group of bar segments have end windings that run in opposite directions.

10. The bar winding arrangement as claimed in claim 9, wherein the first group of bar segments and the second group of bar segments are welded to one another at a first end of the bar winding arrangement and are connected to one another at a second end of the bar winding arrangement, which is opposite the first end, by at least one connection segment that extends over one or more layers of the bar segments.

11. The bar winding arrangement as claimed in claim 1, wherein at least one third group having one or more bar segments is formed in each of the slots, said one or more bar segments having a greater cross section than the bar segments of the first group and the bar segments of the second group and being arranged closer to a slot base of a respective slot than the second group of bar segments.

12. The bar winding arrangement as claimed in claim 11, wherein the bar segments of the third group in all of the slots are connected in series between the opposite ends of the bar winding arrangement.

13. A bar winding arrangement of a stator or a rotor of an electric machine, comprising bar segments, which are housed in a plurality of slots of the stator or the rotor and are electrically connected to one another such that they form a continuous winding of the stator or the rotor, wherein the bar segments are configured and arranged in the slots and connected to one another, wherein the plurality of slots are arranged in the following order: first slot, second slot and third slot,
   wherein the bar segments are arranged in the following order within the first slot: first bar segment, second bar segment, third bar segment and fourth bar segment, and
   wherein the bar segments are arranged in the following order within the second slot: the third bar segment, the fourth bar segment, the first bar segment and the second bar segment,
   wherein the bar segments are arranged in the following order within the third slot: the first bar segment, the second bar segment, the third bar segment and the fourth bar segment.

* * * * *